United States Patent [19]

Otsuki et al.

[11] Patent Number: 5,010,362
[45] Date of Patent: Apr. 23, 1991

[54] IMAGE PROJECTING SYSTEM

[75] Inventors: Hajime Otsuki; Osami Kato; Hideaki Kusano, all of Osaka, Japan

[73] Assignee: Minolta Camera Kabushiki Kaisha, Osaka, Japan

[21] Appl. No.: 579,183

[22] Filed: Sep. 4, 1990

Related U.S. Application Data

[63] Continuation of Ser. No. 222,402, Jul. 21, 1988, abandoned.

[30] Foreign Application Priority Data

Jul. 21, 1987 [JP] Japan .................... 62-182056
Jul. 21, 1987 [JP] Japan .................... 62-182057

[51] Int. Cl.$^5$ ............................................. G03B 27/58
[52] U.S. Cl. .................................................... 355/74
[58] Field of Search ........................................ 355/74

[56] References Cited

U.S. PATENT DOCUMENTS

| | | | |
|---|---|---|---|
| 2,369,897 | 2/1945 | Hjort | 355/74 |
| 3,627,411 | 12/1971 | Nagel | 355/74 |
| 3,674,365 | 7/1972 | Kohler et al. | 355/74 |
| 3,980,407 | 9/1976 | Hill | 355/74 |
| 4,208,124 | 6/1980 | Fox | 355/74 |
| 4,234,251 | 11/1980 | Nishida et al. | 355/74 |

FOREIGN PATENT DOCUMENTS 55-18817  5/1980  Japan .
56-110924 9/1981  Japan .
60-242447 12/1985 Japan .
61-10443  7/1986  Japan .

Primary Examiner—Monroe H. Hayes
Attorney, Agent, or Firm—Price, Gess & Ubell

[57] ABSTRACT

An image projecting system is disclosed which is provided with a carrier part disposed in an optical path between a light source and an image receiver such as, for example, a screen and a sensitive medium and adapted to be loaded with a microfilm. Inside the image projecting system, masking members for adjusting the range of the optical path are fitted. These masking members rotate around the optical axis of the optical path. Even when an image happens to be photographed aslant in the microfilm, only a stated area of the image is projected on the image receiver.

25 Claims, 14 Drawing Sheets

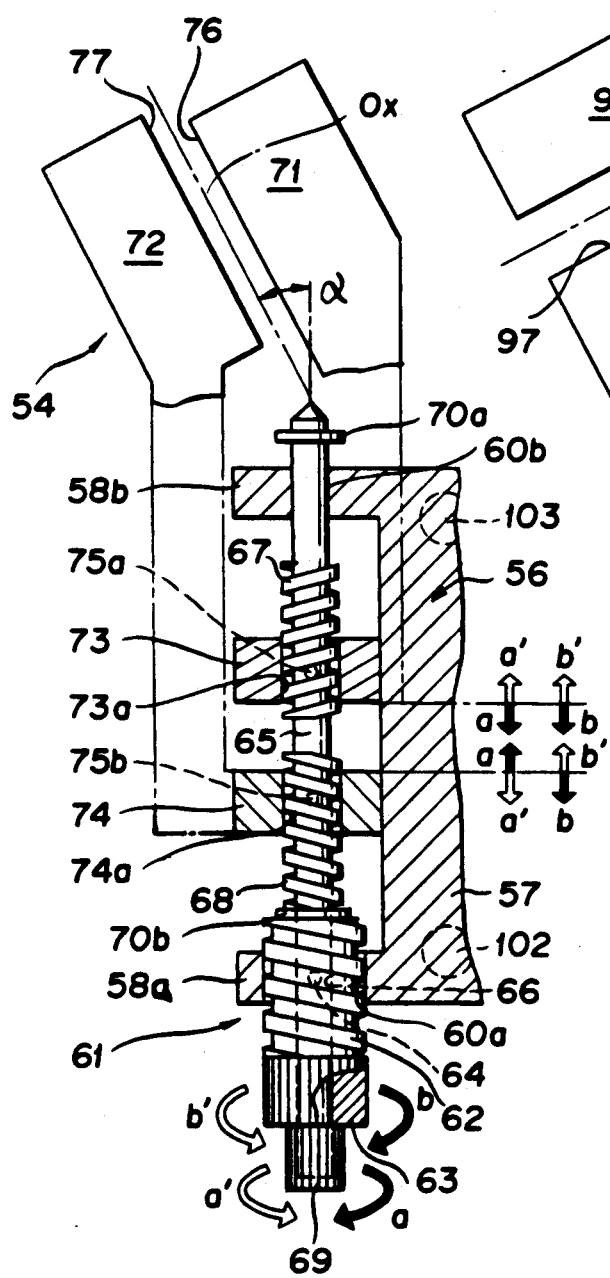
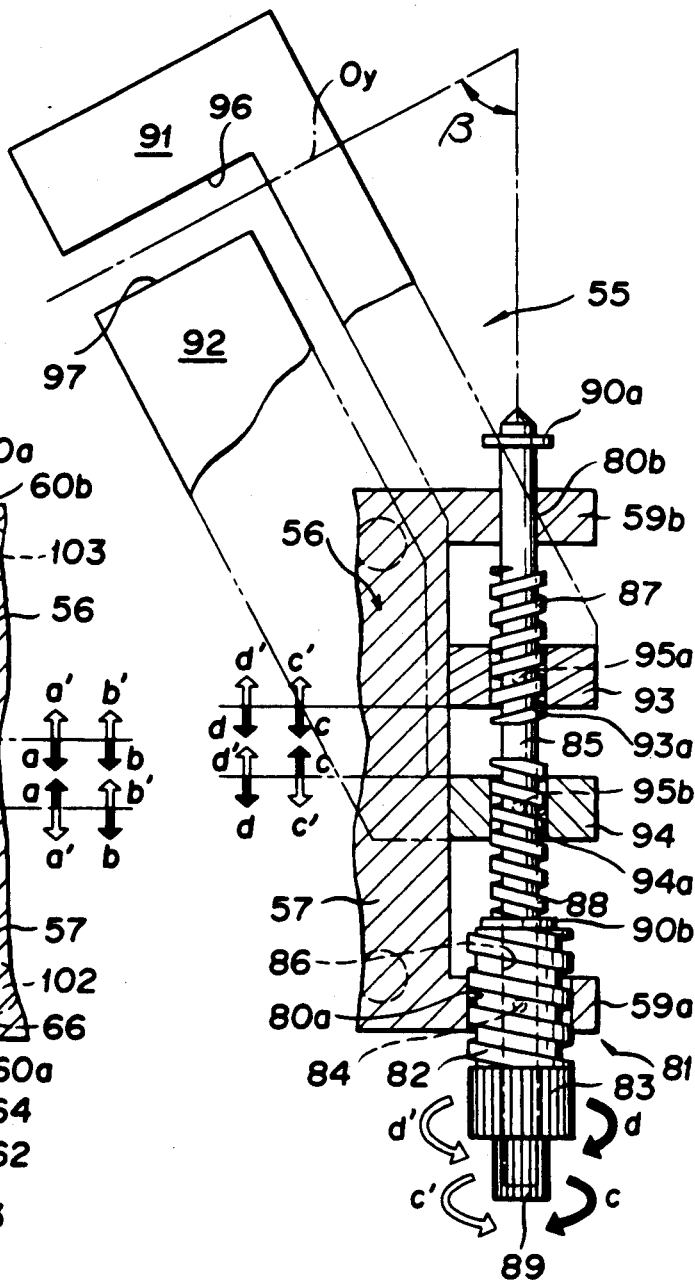

FIG.14a
FIG.15a
FIG.14b
FIG.15b
FIG.14c
FIG.15c
FIG.14d
FIG.15d
FIG.14e
FIG.15e
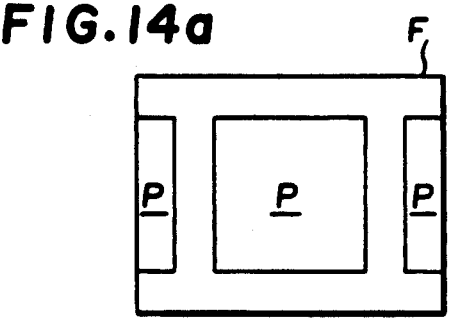
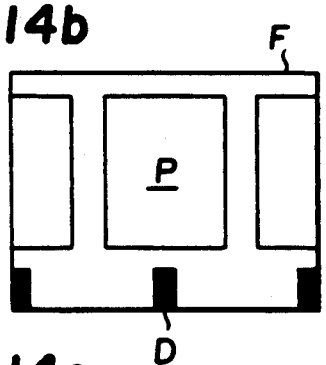
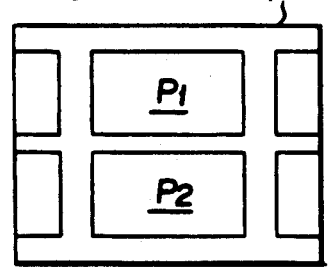
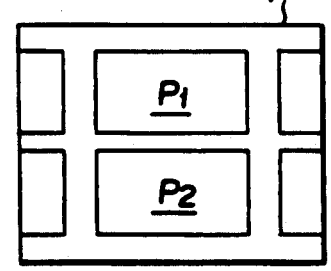
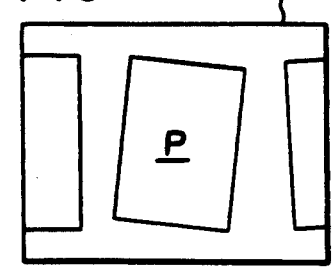
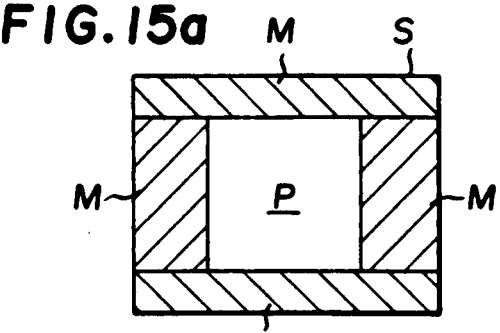
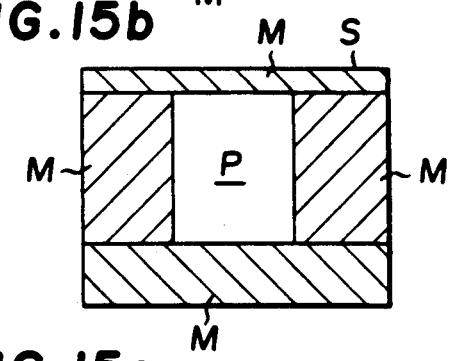
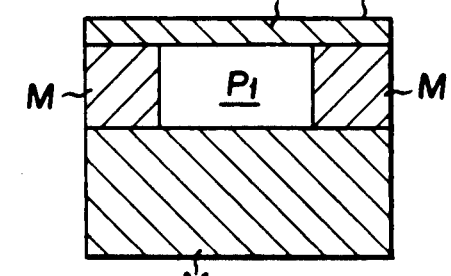
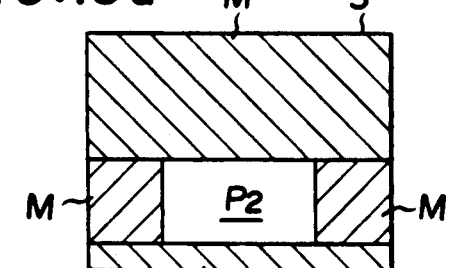
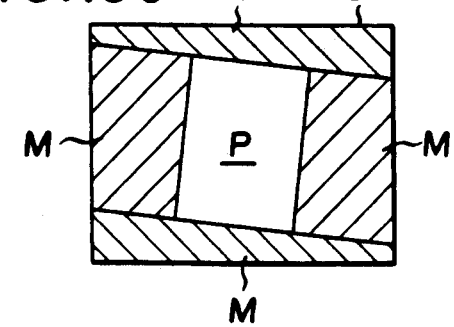

IMAGE PROJECTING SYSTEM

This is a continuation of application Ser. No. 222,402, filed on July 21, 1988 now abandoned.

BACKGROUND OF THE INVENTION

1. Field of the Invention

This invention relates to an image projecting system for projecting an image on a microfilm on a magnified scale on an image receiver. More particularly, this invention relates to an image projecting system intended for use as an image projector for a reader or a reader printer, for example, and provided with a masking device for masking the area of an image on microfilm other than a desired area thereof and allowing only the desired part of the image to be projected on an image receiver.

2. Description of the Prior Art

A reader is used for projecting on a screen a desired image selected from all the images recorded on a microfilm. A reader printer is provided with a screen for the projecting thereon of a desired image selected from all the images recorded on the microfilm and a copying unit for printing the image. The image projecting system of this class incorporates in the optical path thereof a masking device for the purpose of enabling only a desired part of the images recorded on the microfilm to be projected on the screen for close inspection and, at the same time, to be copied.

Japanese Utility Model Publication SHO 55(1980)-18,817 discloses an image projecting system which is provided with a masking plate for the purpose of enabling a desired area of an image selected from the images recorded on a microfiche film to projected on a screen and keeping the area of the image other than the desired area masked. Owing to the use of this masking plate, the masked area of the image is displayed undecipherably on the screen or the area not masked and the masked area are displayed as distinguished from each other on the screen.

Japanese Utility Model Laid-Open SHO 61(1986)-104,443 discloses a copying machine which is provided beneath an original stand with a sheet-like light shielding member having formed therein openings of a plurality of sizes matched to varying sizes of originals. Owing to this construction, the particular one of the openings having a size conforming to the size of a given original is positioned correspondingly to the original so that the light is enabled to pass through the opening and impinge on the original. The conventional techniques of this principle are incapable of tilting the masking area.

Another problem is that images can be recorded as tilted in a microfilm. When this type of microfilm is loaded in a carrier unit and the images under discussion are projected on the screen, these images are displayed in a slanted state. If a microfilm on which such images have been recorded are held in a correct position in the carrier unit, the projected images appear in a tilted state. If the images in this state are copied, then the copied images present a slanted appearance.

SUMMARY OF THE INVENTION

An object of this invention is to provide an image projecting system which is provided with a masking member disposed in the proximity of a microfilm and adapted to follow a slanted image.

Another object of this invention is to provide an image projecting system which is provided with a masking unit having a holder rotatable around the optical axis and a masking element movable in one direction and another masking element movable in a direction perpendicular to the direction mentioned above, both fitted to the holder.

Yet another object of this invention is to provide an image projecting system which is provided with a masking member having a masking edge formed at a predetermined angle relative to the direction of movement of the masking member.

Still another object of this invention is to provide an image projecting system wherein two masking members of which the masking element is composed are adapted to move toward or away from each other and, at the same time, to move synchronously while keeping a fixed distance from each other.

A further object of this invention is to provide an image projecting system which is provided with a masking unit incorporating therein masking elements and separated from a carrier part.

In accordance with one aspect of the present invention, there is provided an image projecting device for causing a light from a light source to impinge on a film, thereby allowing an image on said film to be projected on an image receiver. Said image projecting device is provided with a projection lens for projecting said image on said film onto said image receiver and masking means for intercepting an optical path from said light source to said image receiver, said masking means being rotatable around the optical axis.

In the present invention, since an undesired area of an image is masked, only a desired area of the image can be projected and copied even if the image is tilted. Even if a microfilm is incorrectly located, the image can be projected and copied in a stated posture without requiring any correction of the position of the microfilm. The image projecting system of this invention therefore enjoys a very high operational efficiency.

BRIEF DESCRIPTION OF THE DRAWINGS

FIG. 7 is a cross section illustrating one half of a holder which a first masking element is fitted.

FIG. 8 is a cross section illustrating the other half of the holder to which a second masking element is fitted.

FIG. 14a to FIG. 14e are plan views each illustrating part of a microfilm of varying type.

FIG. 15a to FIG. 15e are plan views illustrating the corresponding microfilms of FIG. 14a to FIG. 14e, each with an area masked.

DESCRIPTION OF THE PREFERRED EMBODIMENTS

Figure 1:
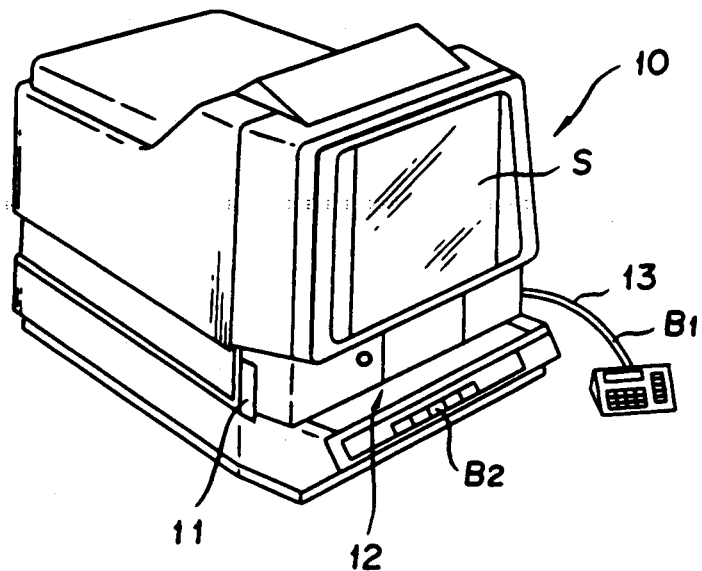
FIG. 1 is a perspective view illustrating the appearance of a typical reader printer as one embodiment of the present invention.

As illustrated in FIG. 1, a reader printer proper, or body 10 for the projection of images recorded on a microfilm is provided with a carrier part 12 having an insertion mouth 11 formed therein and a screen S for projection thereon of images recorded on a microfilm. The reader printer is further provided with a control panel B1 connected to the reader printer body 10 through the medium of a cable 13 and a control panel B2 disposed on the front side of the reader printer body 10.

Figure 3:
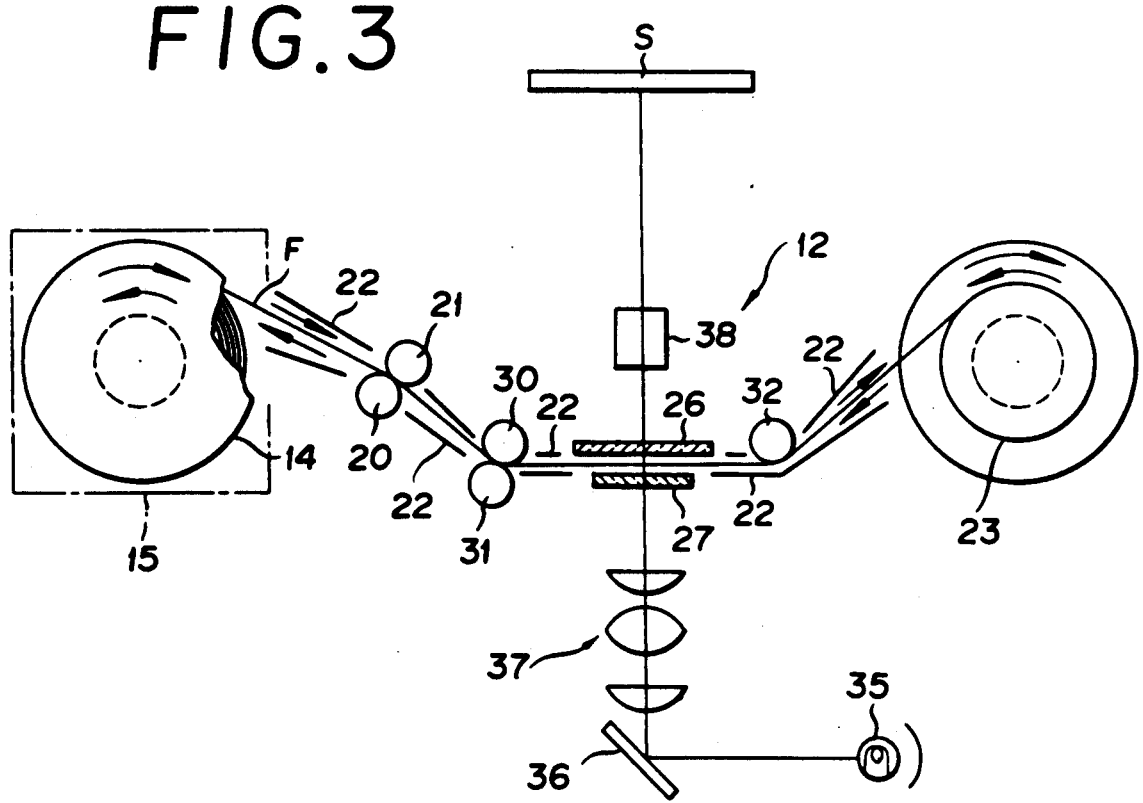
FIG. 3 is a schematic diagram illustrating a carrier part for advancing a microfilm.
Figure 2:
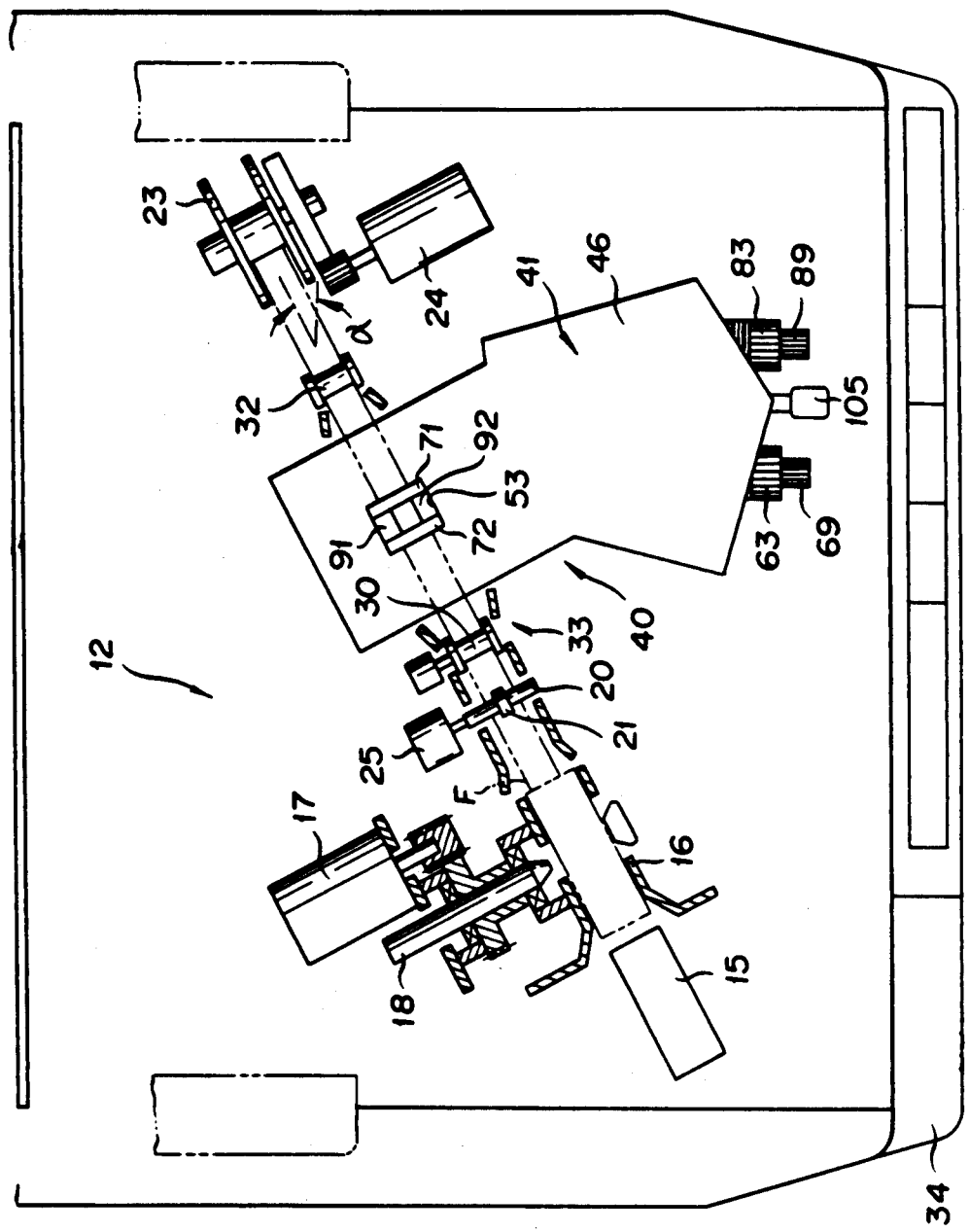
FIG. 2 is a plan view illustrating a carrier part of the reader printer of FIG. 1.

The carrier part 12 is provided, as illustrated in FIG. 2 and FIG. 3, with a housing 16 for accommodating a cartridge 15 incorporating therein a reel 14 which has a roll film, namely a microfilm F, wound up in a roll thereon. This cartridge 15 is loaded in the housing 16 through the insertion mouth 11 which is formed in the reader printer body 10. The housing 16 is provided with a shaft 18 adapted to be rotated by a motor 17 and moved freely toward or away from the cartridge 15. By the rotation of this shaft 18, the microfilm F in the cartridge 15 loaded inside the housing 16 is forwarded as guided by a guide 22 as far as the point of contact between a feed roller 20 and an auxiliary roller 21, both disposed on the downstream side of the housing 16.

The guide 22 is extended to a spool 23 fitted inside the reader printer body 10 apart from the housing 16 and driven by a motor 24. The microfilm F whose leading end has reached the feed roller 20 is advanced through the gap between opposed transparent plates, namely, glass plates 26 and 27, to the spool 23 when the feed roller 20 is driven with a motor 25.

The carrier part 12 in the reader printer body 10 is further provided, as illustrated in FIG. 2 and FIG. 3, with an auxiliary roller 30 and an encoder roller 31 adapted to be pressed against the auxiliary roller 30 across the microfilm F. By the number of rotations of this encoder roller 31, the distance of the advance of the microfilm F is counted. In the downstream side of the upper and lower glass plates 26, 27, a guide roller 32 is disposed at a position falling on the same level as the auxiliary roller 30.

The guide 22 mentioned above forms a carriage path 33 for permitting the forward and rearward movement of the microfilm F. The microfilm F is moved forward and rearward through the carriage path 33 by driving the motors 17, 24 forward and rearward respectively. The carriage path 33 is tilted, as illustrated in FIG. 2, at a stated angle $\alpha$ relative to a front part 34 of the reader printer body 10. The microfilm F, therefore, is carried in a direction aslant the front part 34. The reader printer to be obtained, therefore, is so compact that the main body 10 thereof has a relatively small width as compared with the distance over which the microfilm F is carried.

The carrier part 12 which is composed of the guide 22, the housing 16, the spool 23, etc. can be moved as adjusted relative to the reader printer body 10.

The light from a light source such as a lamp 35, as illustrated in FIG. 3, is reflected by a reflecting mirror 36 and then concentrated by a condenser lens group 37 and then directed toward the microfilm F positioned between the upper and lower glass plates 26, 27. As a result, the image recorded on the microfilm F is projected by a projection lens 38 on a magnified scale on the screen S as an image receiver. The search for a particular image to be projected on the screen S is accomplished by an operator manipulating the control panels B1, B2, thereby moving the microfilm F forward and rearward.

For the image just reviewed on the screen S to be further printed, the operator, by manipulation of the control panels B1, B2, causes the image on the microfilm F to be projected on a photosensitive drum (not shown) as an image reciever and then allows the image consequently formed on the photosensitive drum .to be copied on a sheet by the conventional process.

Inside the carrier part 12 which is disposed in the reader printer body 10, a masking unit 40 is mounted freely detachably as illustrated in FIG. 2 so that only a desired area of the image recorded on the microfilm F will be left exposed and the remaining area kept concealed. The details of the masking unit 40 are illustrated in FIGS. 4 to 10.

Figure 4:
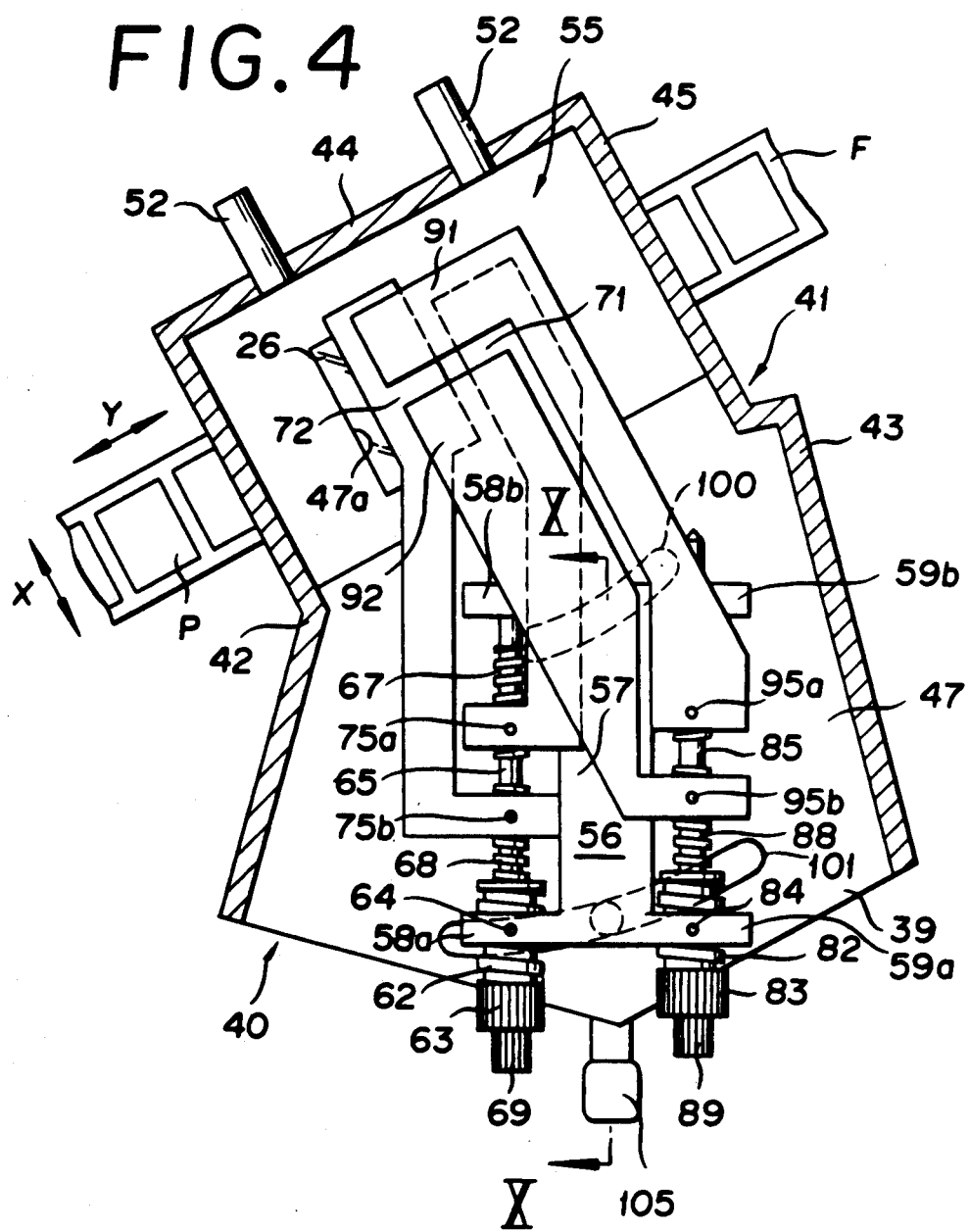
FIG. 4 is a magnified cross section illustrating a masking unit appearing in FIG. 2.

A unit case 41 which constitutes the housing of the masking unit 40 possesses a frame 45 comprising lateral parts 42, 43, each bent as illustrated in FIG. 4 and a rear part 44 having the opposite ends thereof connected to the rear ends of the lateral parts and forming an opening part 39 in the front end part thereof. An upper wall 46 is fitted above and a bottom wall 47 below the frame 45 as illustrated in FIG. 6. The upper glass plate 26 mentioned above is fitted in an opening part 47a which is formed behind the bottom wall 47. This unit case 41 is adapted to be fitted freely detachably with a retaining member 49 which, in turn, is fitted on the guide 22 mentioned above with a screw 48, as illustrated in FIG. 5 and FIG. 6.

Figure 5:
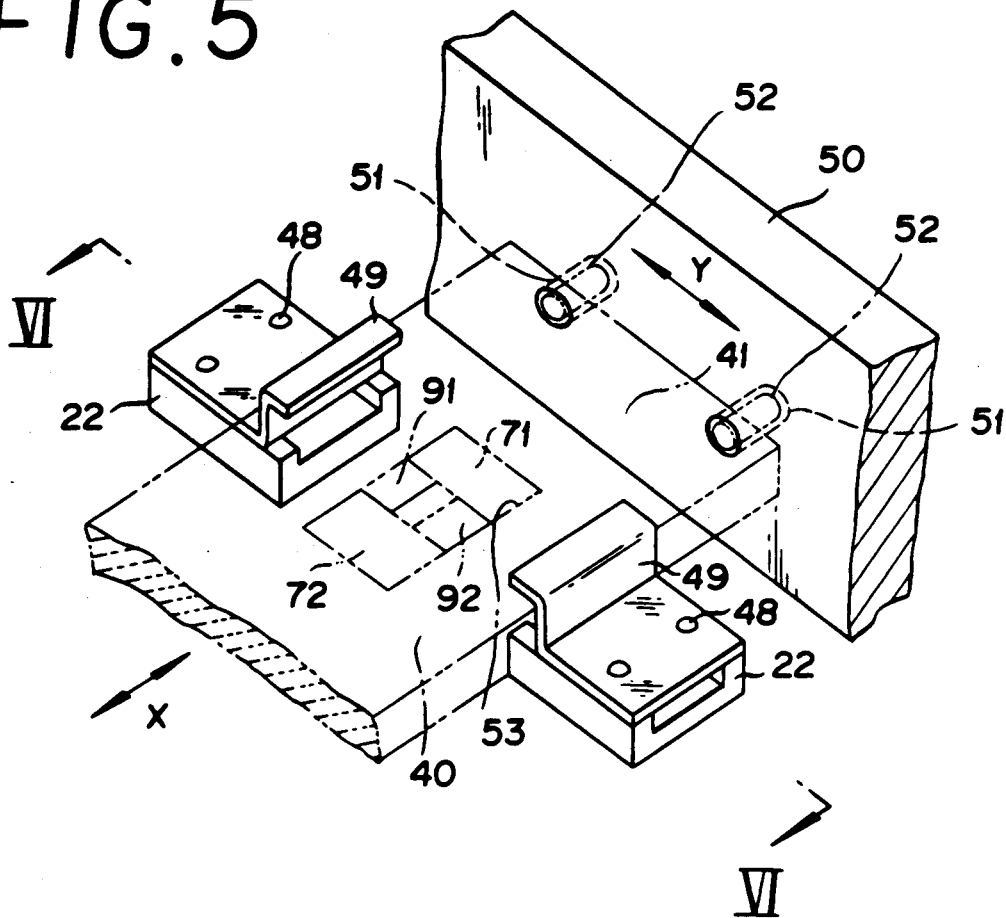
FIG. 5 is a perspective view illustrating a part disposed in the carrier part and serving to support the masking unit.
Figure 6:
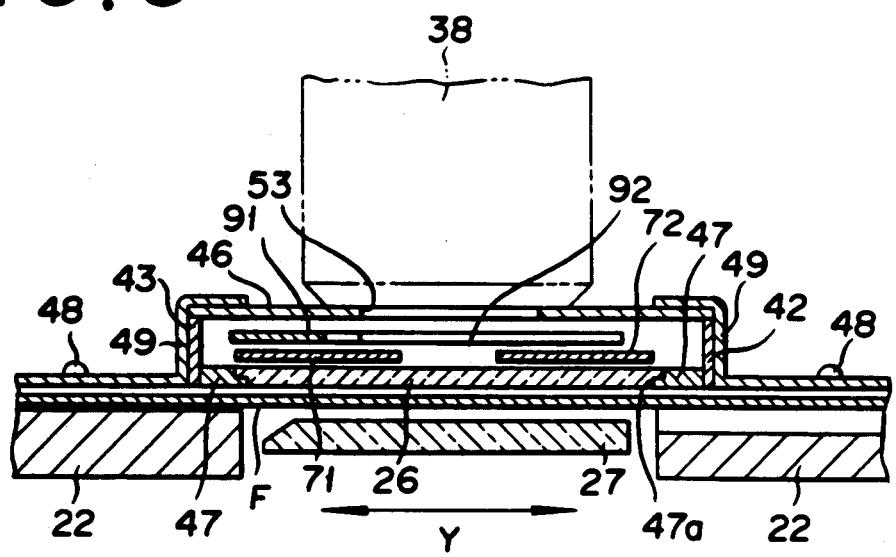
FIG. 6 is a cross section taken across FIG. 5 along the line VI—VI.

To permit ready and accurate location of the unit case 41 in the direction X indicated in FIG. 5 during the fixation of the unit case 41 on the guide 22, holes 51 are formed in a stationary member 50 fitted to the reader printer body 10 as illustrated in FIG. 5 and pins 52 are raised from the rear part 44 of the unit case 41 so as to match with the holes 51.

The upper glass plate 26 mentioned above is fixed on the unit case 41 as illustrated in FIG. 6. By contrast, the lower glass plate 27 mentioned above is so adapted as to be pressed against the upper glass plate 26 across the microfilm F when the microfilm F is kept stopped while the image recorded on the microfilm F is being projected on the image receiver. Optionally, the upper glass plate 26 may be adapted so as to be fitted on the guide 22 instead of being fixed on the unit case 41. The unit case 41 may be fitted to the lower side of the guide 22 in such a manner that the upper wall 47 of the unit case 41 will be opposed to the lower glass plate 27. Whichever construction may be adapted, it is important that at least either of the upper and lower glass plates should be pressed against the other glass plate across the microfilm F.

In the upper wall 46 of the unit case 41, an opening 53 is formed as illustrated in FIGS. 5 and 6 for the purpose of enabling the light from the light source 35 to enter the projection lens 38. This opening 53 fixes the range of the largest optical path leading to the projection lens 38. To permit variation of the range of the light passing through the opening 53 and impinging on the projection lens 38, a first masking element 54 adapted to define the range in one direction such as, for example, the direction Y, namely the direction in which the microfilm F is carried, and a second masking element 55 adapted to define the same range in the direction perpendicular to the direction mentioned above such as, for example, the direction X, namely the direction of the width of the microfilm F, both as illustrated in FIG. 4, are incorporated in the masking unit 40.

The masking elements 54, 55 mentioned above are independently fitted to a rotary member, i.e. a holder 56, adapted to be freely rotated inside the unit case 41 as described specifically below. This rotary holder 56, in the top view, assumes the shape of the letter "H" having bearing parts 58a, 58b projected from the left-hand surface of a main body 57 of the holder 56 in such a manner as to be opposed to each other longitudinally and bearing parts 59a, 59b similarly projected from the righthand surface of the main body 57 similarly to be opposed to each other longitudinally.

One half of the holder 56 is illustrated in FIG. 7. As illustrated in the diagram, a cylinder 61 is rotatably inserted in a through hole 60a formed in the bearing part 58a. This cylinder 61 is provided with a male screw part 62 and a knob 63 formed integrally therewith. This male screw part 62 is meshed with a pin 64 fixed on the bearing part 58a so that when the cylinder 61 is rotated by the knob 63, it is moved in the longitudinal direction by the male screw part 62 being guided by the pin 64. An adjusting shaft 65 is rotatably supported in place by having the leading end thereof fitted in a through hole 66 formed in the cylinder 61 and the rear end thereof fitted in a through hole 60b formed in the bearing part 58b. In the central part of the adjusting shaft 65, two male screw parts 67, 68 are formed. These male screw parts are threaded in mutually reversed directions. The male screw part 68 is threaded counterclockwise when the male screw part 67 is threaded clockwise, for example. A knob 69 is fixed to the leading end of the adjusting shaft 65 and a washer 70a adapted to control the axial movement of the adjusting shaft 65 relative to the holder 56 is fitted to the rear end of the adjusting shaft 65. For the purpose of controlling the axial movement of the adjusting shaft 65 relative to the cylinder 61, a washer 70b is fitted between the male screw member 62 of the cylinder 61 and the male screw members 68 of the adjusting shaft 65.

Two masking members 71, 72 of which the first masking element 54 is formed are made of plate materials impervious to light and having moving blocks 73, 74 fitted relative to the rear ends thereof. In the one moving block 73, a through hole 73a adapted to permit penetration therethrough of the male screw part 67 of the adjusting shaft 65 is formed. To this moving block 73, a pin 75a for engagement with the male screw part 67 is fixed. In the other moving block 74, a through hole 74a adapted to permit penetration therethrough of the male screw part 68 of the adjusting shaft 65 is formed. A pin 75b for engagement with the male screw part 68 is fixed to the moving block 74. At the leading ends of the masking members 71, 72, masking edges 76, 77 are formed as illustrated in FIG. 4 and FIG. 7. These masking edges 76, 77 are tilted at an angle, α, of about 30°, for example, relative to the center of the adjusting shaft 65. Consequently, an imaginary reference line, Ox, set at and extended along the centers of these masking edges 76, 77 is tilted similarly at an angle of 30° relative to the center of the adjusting shaft 65.

If the male screw part 67 is threaded clockwise and the male screw part 68 is threaded counterclockwise, the clockwise rotation indicated by a sign "a" imparted to the adjusting shaft 65 by the knob 69 causes the moving block 73 of the masking member 71 to move toward the leading end of the shaft 65 as indicated by a sign "a" and the moving block 74 of the masking member 72 to move toward the rear end of the shaft 65 as indicated by a sign "a". As a result, the masking edges 76, 77 approach the reference line Ox while keeping themselves in a mutually parallel state and cause the first masking element 54 to narrow the interval of the microfilm F in the direction in which the microfilm F is carried. Conversely, when the knob 69 is turned counterclockwise or in the direction of the arrow "a'", the moving blocks 73, 74 each move in the direction of the arrow "a'", and the masking edges 76, 77 each move away from the reference line Ox while keeping themselves in a mutually parallel state. The rotation of the adjusting shaft 65 in the manner described above does not impart any motion to the cylinder 61.

When the cylinder 61 is rotated clockwise as indicated by the arrow "b" by the knob 63, the cylinder 61 is caused to move forward where the male screw part 62 is threaded counterclockwise as illustrated in the diagram. As a result, the adjusting shaft 65 is moved forward and the two moving blocks 73, 74 are synchronously moved forward, causing the reference line Ox to be shifted without any change in the interval between the masking edges 76, 77 of the masking members 71, 72. In this case, the adjusting shaft 65 products no rotation.

Figure 11:
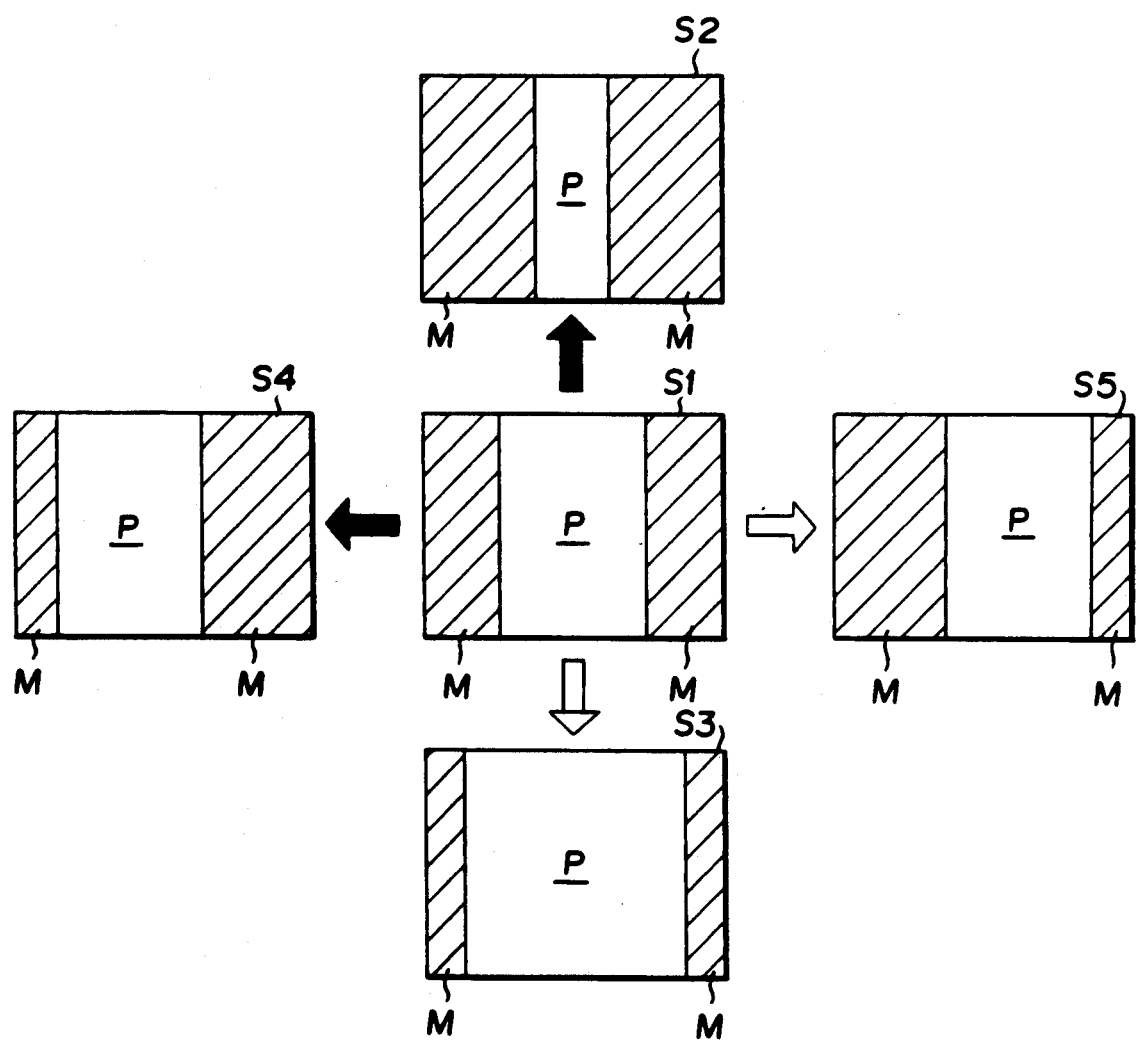
FIG. 11 is a front view illustrating a change produced in the projected image when the first masking element is set operating.

The area of the image P to be projected on the screen S is varied by the movements of the masking members 71, 72 owing to the rotations of the knobs 63, 69 as illustrated in FIG. 11. In FIG. 11, the areas M indicated by hatches are concealed by the masking members 71, 72 and the image area indicated by a sign P is where the projection is made on the screen S.

First, it is assumed that the projection on the screen S is effected in the state of the standard position S1. When the knob 69 is rotated clockwise "a" in this case, the moving blocks 73, 74 mutually approach and the two masking members 71, 72 similarly approach mutually. As a result, the state S1 is changed to the state S2 because the masking area M is widened and the projected image P is narrowed. Conversely, when the knob 69 is rotated counterclockwise, the masking members 71, 72 are separated from each other and the projected image P is widened as illustrated in the state S3.

Under the standard state S1 illustrated in FIG. 11, when the knob 63 is rotated clockwise "b" as indicated in FIG. 7, the cylinder 61 is advanced and, at the same time, the adjusting shaft 65 is advanced. As a result, the two moving blocks 73, 74 are synchronously advanced forward and the masking area M is shifted to that of the state S4 indicated in FIG. 11. During this movement, the interval between the masking edges 76, 77 remains intact. When the knob 63 is rotated reversely, i.e. counterclockwise "b," the projected area P on the screen S is shifted from the standard state S1 to the state S5. In other, words, the projected area P is shifted to the right-hand side without affecting the interval between the masking edges 76, 77.

The other half of the holder is illustrated in FIG. 8. As illustrated in this diagram, a cylinder 81 is rotatably inserted in a through hole 80a formed in the bearing part 59a. This cylinder 81 is provided with a male screw part 82 and a knob 83 formed integrally therewith. This male screw part 82 is meshed with a pin 84 fixed on the bearing part 59a. When this cylinder 81 is rotated by the knob 83, it is moved in the longitudinal direction by the male screw part 82 being guided by the pin 84. The adjusting shaft 85 is supported rotatably by having the leading end thereof fitted in a through hole 86 formed in the cylinder 81 and the rear end thereof fitted in a through hole 80b formed in the bearing part 59b. In the central part of the adjusting shaft 85, two male screw parts 87, 88 are formed. The male screw parts are threaded in mutually reversed directions. The male screw part 88 is threaded counterclockwise where the male screw part 87 is threaded clockwise, for example. A knob 89 is fixed to the leading end of the adjusting shaft 85 and a washer 90a adapted to control the axial movement of the adjusting shaft 85 relative to the holder 56 is fitted to the rear end of the adjusting shaft 85. For the purpose of controlling the axial movement of the adjusting shaft 85 relative to the cylinder 81, a washer 90b is fitted between the male screw part 82 of the adjusting shaft 85 and the male screw part 88.

Two masking members 91, 92 of which the second masking element 55 is formed are made of plate materials impervious to light. Moving blocks 93, 94 are fitted respectively to the rear ends of the masking members 91, 92. In the one moving block 93, a through hole 93a is formed for permitting penetration therethrough of the male screw part 87 of the adjusting shaft 85. A pin 95a adapted to be meshed with the male screw part 87 is fixed to the moving block 93. In the other moving block 94, a through hole 94a is formed for permitting penetration therethrough of the male screw part 88 of the adjusting shaft 85. A pin 95b adapted to be meshed with the male screw part 88 is fixed to the moving block 94. Masking edges 96, 97 are respectively formed at the leading ends of the masking members 91, 92. These masking edges 96, 97 are tilted at an angle, $\beta(\beta = 90° - \alpha)$, of about 60° relative to the center of the adjusting shaft 85. An imaginary reference line, Oy, set at and extended along the centers of the masking edges 96, 97 is consequently tilted at an angle of 60° relative to the axis of the adjusting shaft 85.

Where the male screw part 87 is threaded clockwise and the male screw part 88 counterclockwise, for example, the clockwise rotation imparted by the knob 89 to the adjusting shaft 85 as indicated by a sign "c" causes the moving block 93 of the masking member 91 to be moved toward the leading end of the shaft 85 as indicated by a sign "c" and the moving block 94 of the masking member 92 to be moved toward the rear end of the shaft 85 as indicated by a sign "c". As the result, the masking edges 96, 97 approach the reference line Oy while keeping themselves in a mutually parallel state and the second masking element 55 narrows the interval of the microfilm F in the direction of the width thereof. Conversely, the rotation of the knob 89 in the counterclockwise direction, i.e., the direction of the arrow "c'", causes the moving blocks 93, 94 to each move in the direction of the arrow "c'" and the masking edges 96, 97 to move away from the reference line Oy while keeping themselves in a mutually parallel state relative to the reference line Oy. The rotation of the adjusting shaft 85 in the manner mentioned above imparts no motion whatever to the cylinder 81.

The clockwise rotation imparted by the knob 83 to the cylinder as indicated by an arrow "d" cause the cylinder 81 to move forward where the male screw part 82 is threaded counterclockwise as illustrated in the diagram. As a result, the adjusting shaft 85 is moved forward and the two moving blocks 93, 94 are synchronously moved forward. The reference line Oy is consequently shifted without affecting the interval between the masking edges 96, 97 of the masking members 91, 92. In this case, the adjusting shaft produces no rotation.

Figure 12:
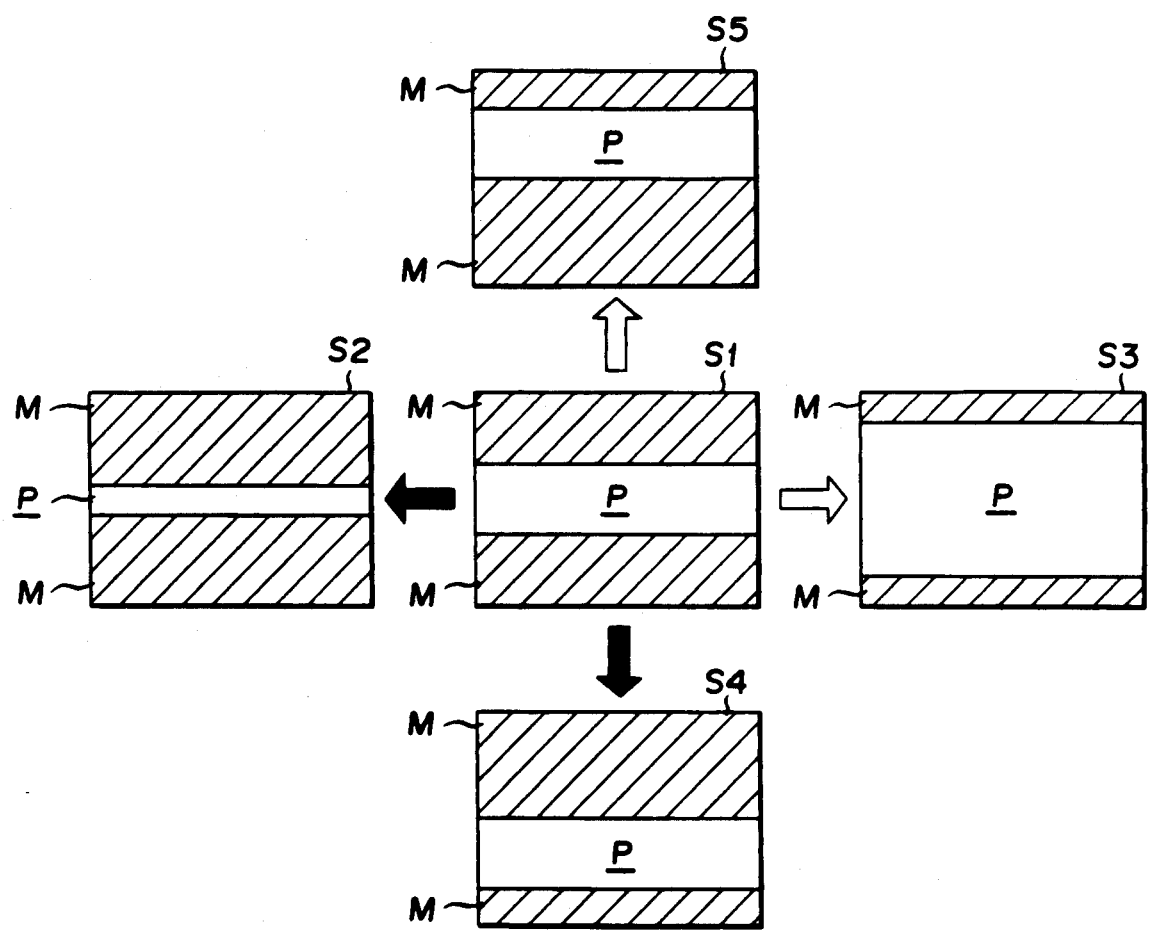
FIG. 12 is a front view illustrating a change produced in the pro image when the second masking element is set operating.

The area of the image P projected on the screen S is varied by the movements of the masking members 91, 92 owing to the rotations of the knob 83, 89 as illustrated in FIG. 12. The areas M indicated with hatches in FIG. 12 are concealed by the masking members 91, 92 similarly to those of FIG. 11, and the area indicated by a sign P represents an area wherein the projection is effected on the screen S.

First, it is assumed that the projection on the screen S is effected in the state of the standard position S1. When the knob 89 is rotated in the clockwise direction "c", in this case, the moving blocks 93, 94 mutually approach and the two masking members similarly approach mutually. Thus, the standard state S1 is shifted to the state S2 wherein the masking areas M are widened and the projected image P is narrowed. conversely, when the knob 89 is rotated counterclockwise, the masking members 91, 92 are separated from each other and the standard state S1 is shifted to the state S3 in which the projected image P is widened.

When the knob 83 is rotated in the clockwise direction "d" as indicated in FIG. 8 under the standard state S1 illustrated in FIG. 12, the cylinder 81 is advanced and, at the same time, the adjusting shaft 85 is advanced. As a result, the two moving blocks 93, 94 are synchronously moved forward and the masking areas M are varied to those of the state S4 illustrated in FIG. 12. During this movement, the interval between the masking edges 96, 97 remains intact. Conversely, when the knob 83 is rotated in the reverse direction or the counterclockwise direction "d'", the area P projected on the screen S is shifted from the state S1 to the state S5. In other words, the projected area P is shifted toward the rear side without any change in the interval between the masking edges 96, 97. The angles $\alpha$, mentioned may be freely selected on the condition that the reference lines Ox and Oy are perpendicular to each other.

The masking unit 40 is adapted so as to be freely attached to or detached from the guide 22 forming the carrier part 12 of the reader printer body 10 by means of the retaining member 49. The masking unit 40, therefore, can be fitted in and removed from the body 10. Thus, the parts used inside the masking unit 40 can be easily maintained or replaced. The image projecting device retains the serviceability thereof even while the masking unit 40 is kept out of place. In this case, it is desirable to fill the portion from which the masking unit 40 has been removed with a spacer identical in shape to the masking unit 40.

Figure 9:
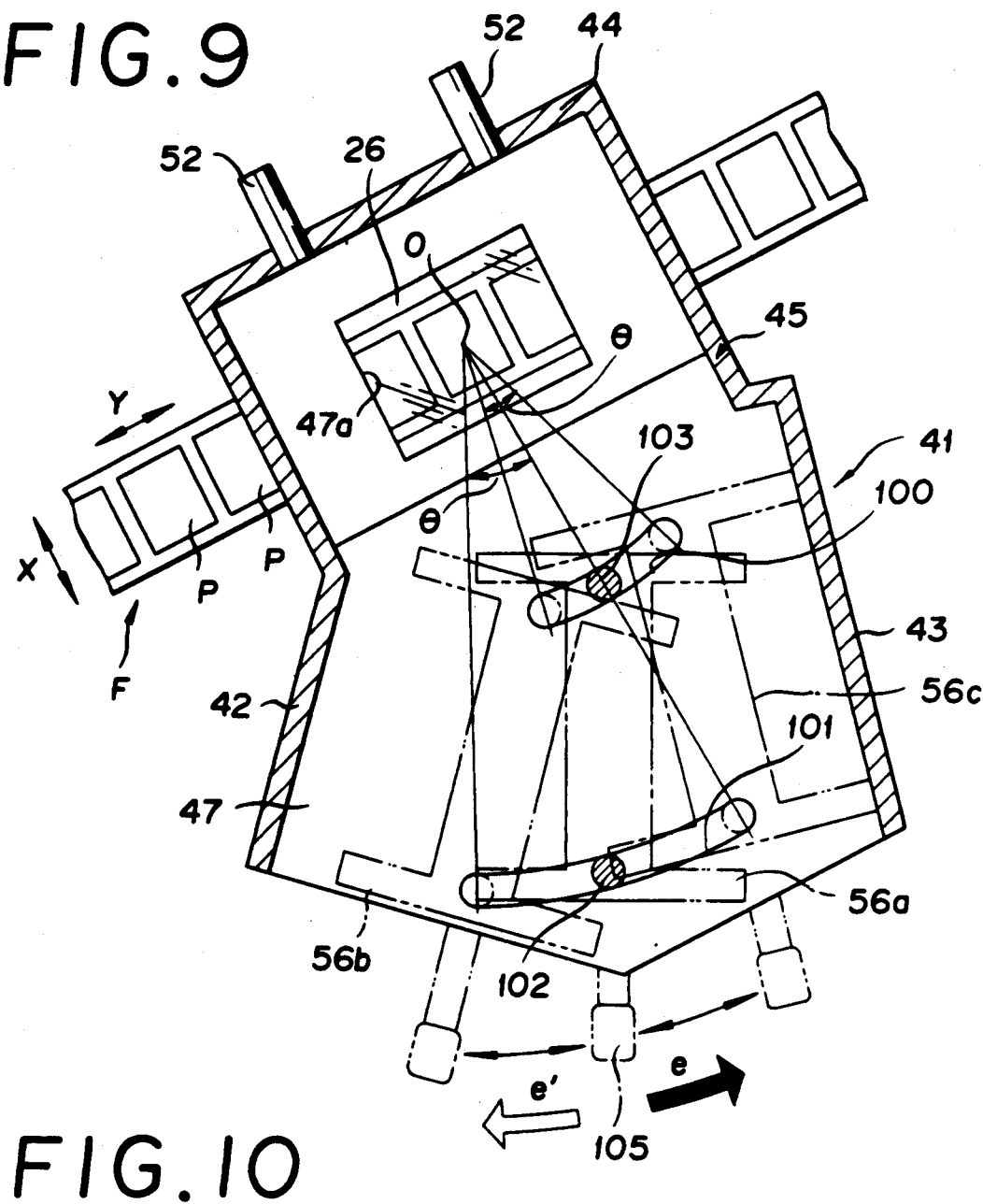
FIG. 9 is a cross section of the masking unit illustrating the surface of the bottom wall of the masking unit.

FIG. 9 is a diagram illustrating the surface of the bottom wall 47 of the unit case 41. In this bottom wall 47 are formed an inner guide groove 100 in the shape of an arc having the optical axis 0 as the center thereof, and an outer guide groove 101 in the shape of an arc having the optical axis 0 as the center thereof, and having a larger radius of curvature than the inner guide groove 100. These guide grooves 100, 101 are extended within sectors of a fixed angle, θ, having the optical axis 0 as the center thereof. Since the outer guide groove 101 has a large radius of curvature, it naturally has a greater length than the inner guide groove 100. These two guide grooves 100, 101 have their phases deviated from each other by an angle of θ/2.

Two pins 102, 103 are projected from the lower surface of the holder 56 in such a manner that the one pin 102 is thrust through the outer guide groove 101 and the other pin 103 is thrust through the inner guide groove 100. While the holder 56 is kept set at the central position within the unit case, the pins 102, 103 are located at the centers indicated by hatches in FIG. 9. In this state, the reference line Ox coincides with the direction of width, X, of the microfilm and the reference line Oy with the direction of carriage, Y, of the microfilm F. These pins 102, 103 are allowed to move inside the guide grooves 101, 100 in either direction up to an angle of θ/2 from the aforementioned centers. The movement of the pins 102, 103 causes the holder 56 to revolve around the optical axis as the center thereof within the angle θ. In FIG. 9, the symbol 56a denotes the central position of the holder 56, the symbol 56b the state the holder 56 assumes after it has been moved to the leftmost end, and the symbol 56c the state the holder 56 assumes after it has been moved to the rightmost end. By this revolution of the holder 56, the masking elements 54, 55 are sympathetically revolved around the optical axis 0 as the center thereof within the angle θ.

Figure 10:
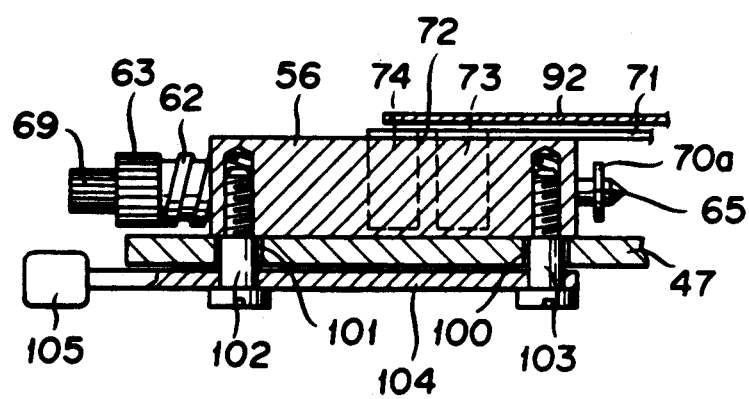
FIG. 10 is a cross section taken through FIG. 4 along the line X—X.

For the purpose of effecting the revolution of the holder 56 described above, a knob 105 is fixed to the leading end of a rod 104 which is attached to the holder 56 through the medium of the pins 102, 103 as illustrated in FIG. 10. The revolution of the holder may otherwise be effected by the use of any of the knobs 63, 69, 83, and 89 mentioned above instead of using the knob 105.

Figure 13:
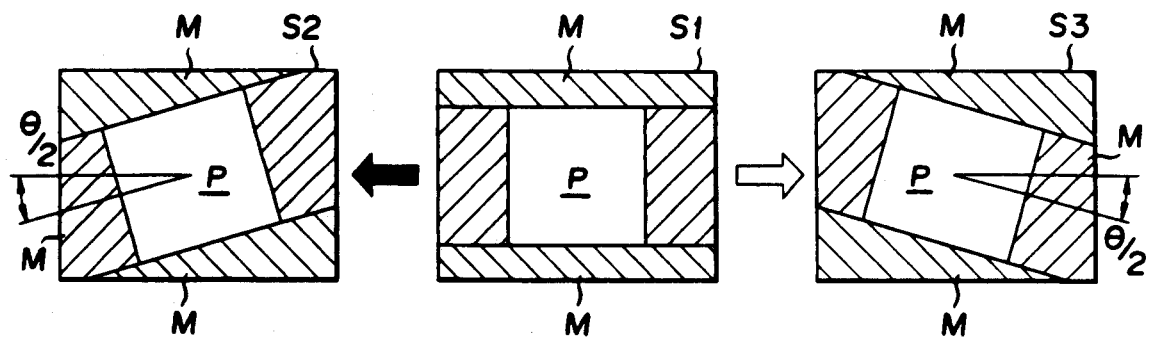
FIG. 13 is a front view illustrating a change to be produced in projected image when the masking member is rotated.

FIG. 13 is a diagram illustrating changes to be produced in the masking area by the rotation of the holder 56 around the optical axis 0 as the center. It is now assumed that the projection on the screen S is effected in the standard state S1 illustrated in FIG. 13. In this state, the reference line Ox coincides with the direction of the width of the microfilm F and the reference line Oy with the direction or conveyance of the microfilm F. When the holder 56 in this state is revolved in the counterclockwise direction "e" around the optical axis 0 as the center illustrated in FIG. 9, the range of the image P projected on the screen is tilted in the state indicated by the symbol S2. Conversely, when the holder 56 is revolved in the clockwise direction "e'", the image P is tilted in the state indicated by the symbol S3.

In order for the manipulation of the knobs 61, 63, 81, 83, and 105 by the operator to be carried out on the front side of the reader printer body 10 illustrated in FIG. 1 and FIG. 2, these knobs are located in the front part of the reader printer body 10 and the adjusting shafts 65, 85 are faced in the longitudinal direction of the reader printer body 10 while the holder 56 is in the standard position thereof. The direction of the carriage of the microfilm F, therefore, is tilted at an angle, a, of 30°, for example, relative to the front side of the reader printer body 10. It follows that the width of the reader printer body 10 can be fixed at a small size as compared with the length of the carriage path of the microfilm F. Optionally, the aforementioned manipulation of the knobs by the operator may be carried out on the lateral side of the reader printer body 10. In this case, the carriage path of the microfilm F is tilted relative to the lateral side of the reader printer body 10.

The procedure to be followed in the operation of causing a desired one of the images recorded in the microfilm to be projected on the screen S by the use of the reader printer of the present invention will be described below.

The light from the lamp 35 is caused to impinge on the microfilm F played out of the carridge 15 which is loaded in the housing 16 disposed within the carrier inside the reader printer body 10. The result is that the image P recorded on the microfilm F is projected on the screen. The image thus projected on the screen is available for review. The area of the image thus projected on the screen is adjusted by varying the interval between the masking edges 76, 77 and the interval between the masking edges 96 and 97 and further tilting these masking edges through suitable manipulation of the first masking element 54 and the second masking element 55 inside the masking unit 40. The size and position of the masking area M can be arbitrarily and freely moved, altered, and set correspondingly to an area to be selected in the image P recorded on the microfilm F.

Where the desired area of the image P which has been projected on the screen as described above is desired to be further printed, the image is caused to impinge on the sensitive drum as an image receiver by switching the optical path.

FIG. 14a to FIG. 14e are diagrams partly illustrating varying types of microfilm F having images recorded differently thereon. The varying masking areas M to be set by the masking members 71, 72, 91, and 92 correspondingly to the varying types of microfilm F are illustrated in FIG. 15a to FIG. 15e bearing the respective suffixes a to e.

FIG. 14a is a diagram illustrating a standard microfilm F having images P recorded in the central part thereof in the direction of the width. In this case, the masking edges 76, 77, 96, and 97 are caused by the knobs 69, 89 to coincide with the boundaries of the image P, with the holder 56 set at the central position 56a indicated in FIG. 9 and the point of intersection of the reference lines Ox and Oy fixed on the optical axis O. As a result, the masking area M is obtained as illustrated in FIG. 15a.

FIG. 14b illustrates a microfilm F having images P recorded thereon in conjunction with blip marks D which are photographed in the channel part. In this case, since the images P are deviated in the direction of the width of the microfilm F, the masking area M is adjusted as illustrated in FIG. 15b by rotating the knob 83 illustrated in FIG. 8 in the counterclockwise direction d' and shifting the reference line Oy proportionately. As the result, only a desired one of the images P is projected on the screen S while the blip marks are left unprojected.

FIG. 14c and FIG. 14d are diagrams each illustrating a dual-format type microfilm F having images P1 and images P2 recorded thereon as arranged in two rows. When the sizes of areas desired to be masked are set in advance by the rotation of the knobs 69, 89, the relevant masking members can be easily shifted by rotating the knob 83 and moving the reference line Oy so as to mask the areas other than the image P1 in one of the two rows as illustrated in FIG. 15c or the areas other than the image P2 in the other row as illustrated in FIG. 15d.

FIG. 14e illustrates a microfilm F having one particularly image P recorded as tilted. In this case the masking areas M are varied correspondingly to the tilted image P by rotating the holder 56 around the optical axis 0, with the result that only the desired area of the microfilm F will be projected on the screen S. In order for the image projected in the state as described above to be further copied, the image projected on the screen S must be caused to impinge on the photosensitive medium.

The following operation is required where only the desired image is to be projected on the screen S and, at the same time, this image is to be adjusted correctly in position relative to the screen S and the corrected image is to be further copied. To be more specific, where the image P happens to be recorded as slanted relative to the standard position on the microfilm F, the image P is projected aslant on the screen S.

The operator, therefore, is required to rotate the masking members 71, 72, 91, and 92 in suitable directions by suitable amounts by comparing the tilted image P and the masking areas M and moving the holder 56 accordingly. The masking areas M thus rotated are as shown in FIG. 15e. Then the operator, on confirming perfect agreement between the image P and the masking areas M on the screen, carries out what is called "carrier rotation" by causing the carrier part 12 which has the microfilm F loaded thereon to be rotated around the optical axis 0 as the center. During this carrier rotation, the masking unit 40 is rotated in concert with the carrier part 12 inside the reader printer body 10. On the screen S, therefore, the image P in its correct position is projected with the masking edges coinciding with the boundaries thereof as illustrated in FIG. 15a. When the image P projected in this state is subjected to a copying operation, the image in the correct position will be copied.

The carrier rotation operation described above may be carried out in a procedure completely reversed from the procedure described above. First, the image P is corrected on the screen for elimination of any inclination. In this case, the carrier part 12 is rotated in concert with the masking unit 40 in the same manner as described above. Then, the masking members are rotated by the holder 56 in the manner described above. As a result, the image P in a correct state is projected on the screen S as illustrated in FIG. 15a.

Optionally, the correction of the tilted image in position may be attained by prism rotation instead of the carrier rotation described above. In this case, a conventional prism (not shown) adapted to rotate around the optical axis 0 is disposed above the projection lens 38. The image P is rotated by the rotation of this prism.

Figures 16A, 16B, 16C:
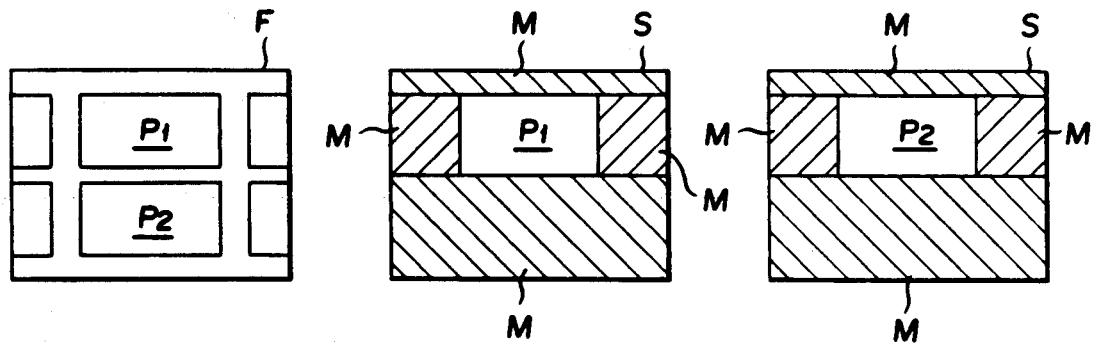
FIG. 16a to FIG. 16c are plan views illustrating a case in which masking areas are shifted by the use of a masking unit disposed independently of the carrier part.

In the illustrated masking unit of this invention, the masking unit 40 is fitted to the guide 22 which constitutes itself the carrier part 12 so that, during the carrier rotation, the masking unit 40 will be rotated in concert with the guide 22. Optionally, the masking unit 40 may be fitted to the reader printer body 10 as isolated from the carrier part 12. In this case, the masking operation can be carried out as illustrated in FIG. 16a to FIG. 16c. FIG. 16a, similarly to FIG. 14c, is a diagram illustrating a dual-format type microfilm having images P1 and P2 recorded in two rows. In this case, only a particular image P1 in one of the two rows is projected on the screen S and the other areas are masked as illustrated in FIG. 16b by the procedure described above. When the microfilm F in this state is slid out of place by the carrier 12, since the masking unit 40 operates independently of the guide 22, the image p2 can be projected on the screen S as illustrated in FIG. 16c without requiring any movement of the masking members.

Figure 17:
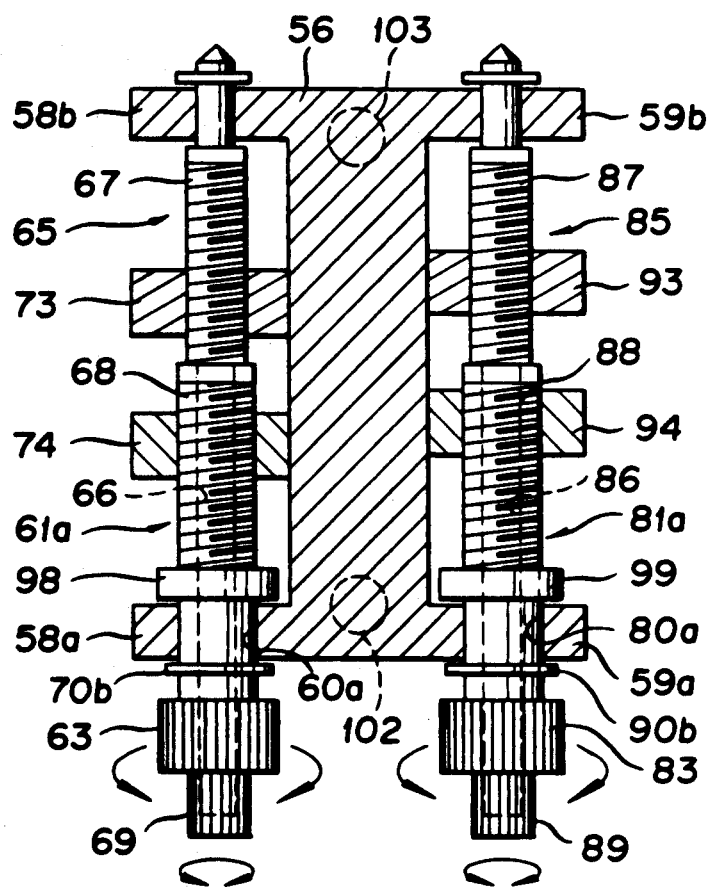
FIG. 17 is a cross section illustrating a typical holder as another embodiment of the present invention.

FIG. 17 illustrates another type of the masking unit 40 illustrated in FIG. 4. In this case, a hollow adjusting shaft 61a is rotatably fitted in the through hole 60a of the bearing part 58a and the adjusting shaft 65 is rotatedly inserted into the through hole 66 formed in the hollow adjusting shaft 61a. The female screw with which the male screw part 67 of the adjusting shaft 65 is to be meshed is formed on the moving block 73. Further, the knob 69 is formed at the leading end thereof. The male screw part 68 adapted to be meshed with the female screw part formed on the moving block 74 is formed on the hollow adjusting shaft 61a and the knob 63 is disposed on the leading end thereof.

Similarly, a hollow adjusting shaft 81a is fitted rotatably in the through hole 80a of the bearing part 59a and the adjusting shaft 85 is rotatably inserted in the through hole 86 formed in the hollow adjusting shaft 81a. The female screw part adapted to be meshed with the male screw part 87 of the adjusting shaft 85 is formed on the moving block 93 and the knob 89 is disposed on the leading end thereof. The male screw part 88 adapted to be meshed with the female screw part formed on the moving block 94 is formed on the hollow adjusting shaft 81a and the knob 83 is disposed on the leading end thereof. The male screw parts 67, 68, 87, and 88 illustrated in FIG. 17 are longer than the corresponding male screw parts illustrated in FIG. 4. Stoppers of a large diameter 98, 99 are disposed respectively on the hollow adjusting shafts 61a, 81a. In FIG. 17, the members which have equivalents appearing in FIG. 7 and FIG. 8 are denoted by like reference numerals. In the masking unit 40 illustrated in FIG. 17, the masking member 71 is moved independently of the other masking member 72 and the masking member 91 is moved independently of the other masking member 92.

The moving blocks 73, 74, 93, and 94 are illustrated in FIG. 17 as having female screw parts formed thereon. The moving blocks illustrated in FIG. 7 and FIG. 8 may have female screw parts formed thereon in place of the pins.

The embodiments cited thus far have been illustrated as being provided with two independently movable masking elements 54, 55. Optionally, only one of the masking elements may be adapted as a movable component and the other masking element as a stationary component.

In the illustrated embodiments, the carrier part 12 is adapted to have the microfilm F loaded thereon as wound up in a roll. This invention can be embodied in the image projecting system of the type configured for use with a microfiche film. The movement of the carrier part described above may be attained either electrically or manually.

Figure 18:
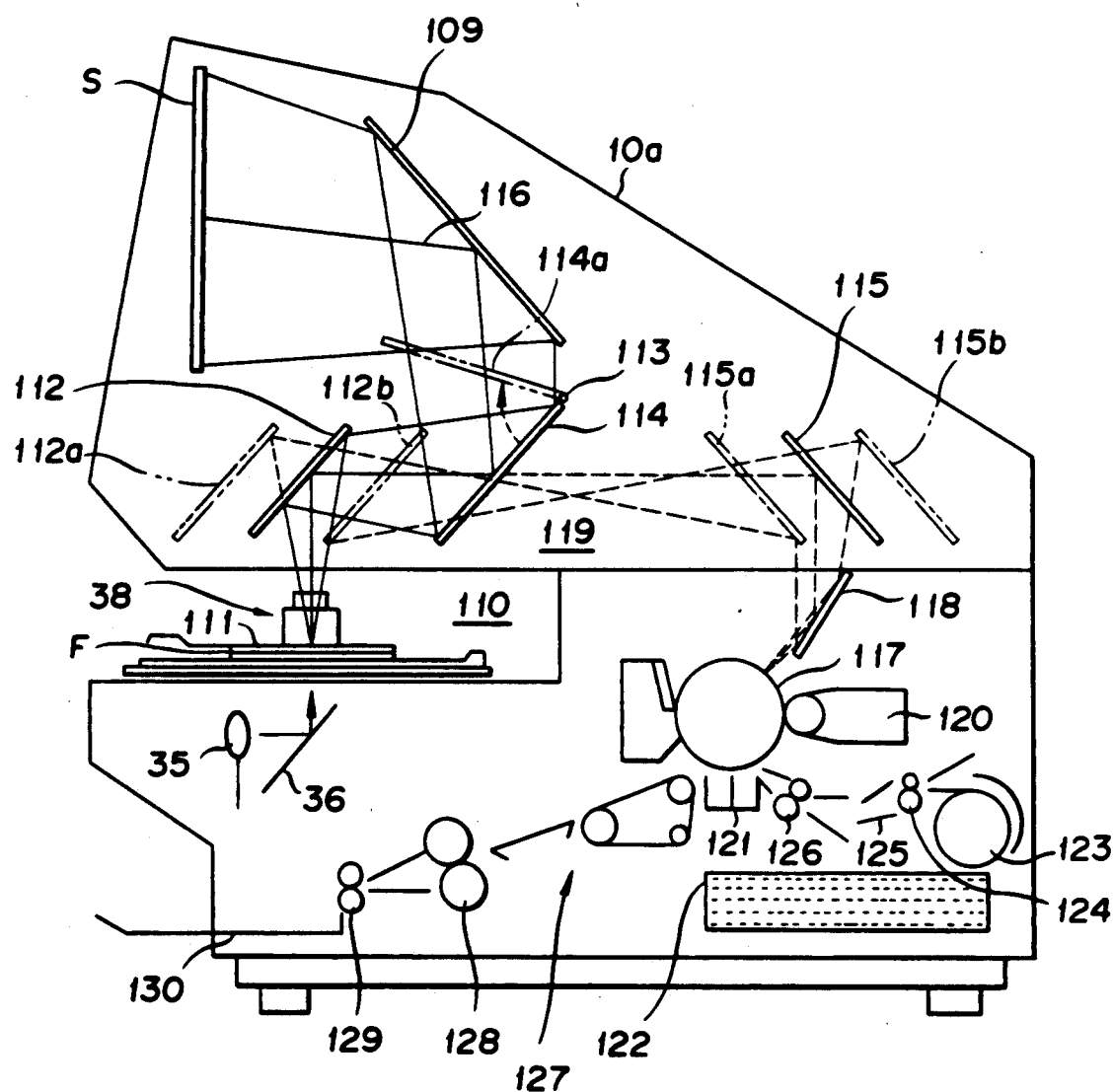
FIG. 18 is a schematic diagram illustrating the inner structure of a typical reader printer as another embodiment of the present invention.

FIG. 18 schematically illustrates the inner construction of a reader printer body 10a of the type suitable for use with the microfiche film mentioned above. As illustrated in the diagram, a screen S is disposed in the upper part of the front side of a reader printer body 10a. A recess 110 is formed below the screen S. The interior of this recess 110 is adapted so that a microfilm carrier part 111 for supporting the microfilm F thereon will be detachably fitted. The light from the light source 35 is caused to impinge upon the microfilm F supported on the microfilm carrier part 111 through the medium of the mirror 36. The microfilm carrier part III is mounted on the projection lens 38, which enables a desired one of the images recorded on the microfilm F to be projected into the upper part of the reader printer body 10a.

Inside the reader printer body 10a, a first mirror 112 adapted to be impinged on by the optical path of projection is passed through the projection lens 38. A second mirror 114 is adapted to be freely rotated around a shaft 113 and to be impinged on by the optical path of projection reflexed from the mirror 112 with the reader's working position fixed as indicated by a continuous line. A third mirror 109 is adapted to be impinged on by the optical path of projection reflected by the mirror 114 and enabled to reflect the incident optical path onto the screen S. These mirrors 112, 114, and 109 form a reader's optical system 116 or directing the optical path of projection from the projection lens 38 toward the screen S.

Inside the reader printer body 10a, a fourth mirror 115 is disposed as opposed to the first mirror 112 across a stated distance. When the second mirror 114 adapted to be freely rotated around the shaft 113 is retracted to a position indicated by an imaginary line denoted by a symbol 114a in FIG. 18, the optical path of projection reflected by the first mirror 112 is directed toward the fourth mirror 115 and the optical path of projection reflected thereon is directed toward a photosensitive drum 117 through the medium of a fifth mirror 118 disposed between the fourth mirror 115 and the photosensitive drum 117. The optical path originating in the first mirror 112, leaping over the mirrors 115, 118, and through throwing a narrow strip of light on the sensitive drum 117 forms a mirror scan type printer's optical system 119.

The first mirror 112 and the fourth mirror 115 are mounted on a moving base (not shown) and are synchronously moved thereby while keeping a fixed length of optical path therebetween from the positions denoted by symbols 112a and 115a to the positions denoted by symbols 112b and 115b. Owing to this construction, the printer's optical system 119 is enabled to produce a scanning motion in the longitudinal direction of the printer body 10a.

Inside the reader printer body 10a, a developer 120 for causing adhesion of a toner to the electrostatic latent image formed on the sensitive drum 117 is disposed as juxtaposed to the photosensitive drum 117. A transfer charger 121 for causing transfer of the toner to a copying paper is disposed below the photosensitive drum 117 inside the reader printer body 10a.

A feed paper cassette 112 for accommodating copying papers is disposed below the photosensitive drum 117. By a pickup roll 123, the copying papers held inside the feed paper cassette 122 are successively forwarded via a roller 124 and a guide 125 to a timing roller 126. This timing roller 126 serves the purpose of controlling the timing for supply of copy papers to the transfer charger 121. By this timing roller 126, the copying papers are each fed between the photosensitive drum 117 and the transfer charger 121, with the result that the electrostatic latent image formed on the periphery of the photosensitive drum 117 will be transferred onto the copying paper. The copying paper on which the transferred toner image has been deposited is advanced by a conveyor 127 to a fixing unit 127 so as to have the toner image fixed thereby. The copying paper on which the toner image has been fixed is conveyed by a roller 129 to a paper discharge tray 130.

Figure 19:
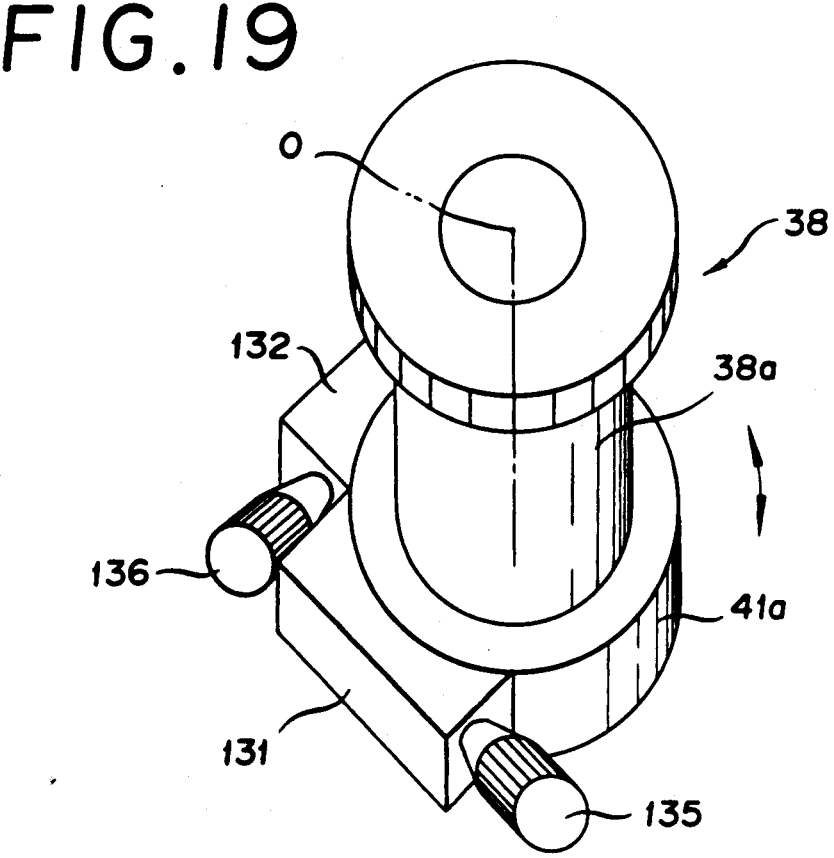
FIG. 19 is a perspective view illustrating a masking unit integrated with a projecting lens appearing in FIG. 18.

The masking unit to be used for the reader printer illustrated in FIG. 18 is constructed as shown in FIG. 19. An annular base 41a constituting itself a masking unit case is fitted to the microfilm side or lower end side of a lens barrel 38a of the projection lens 38 in such a manner as to be freely rotated around the optical axis 0 as the center.

Figure 20:
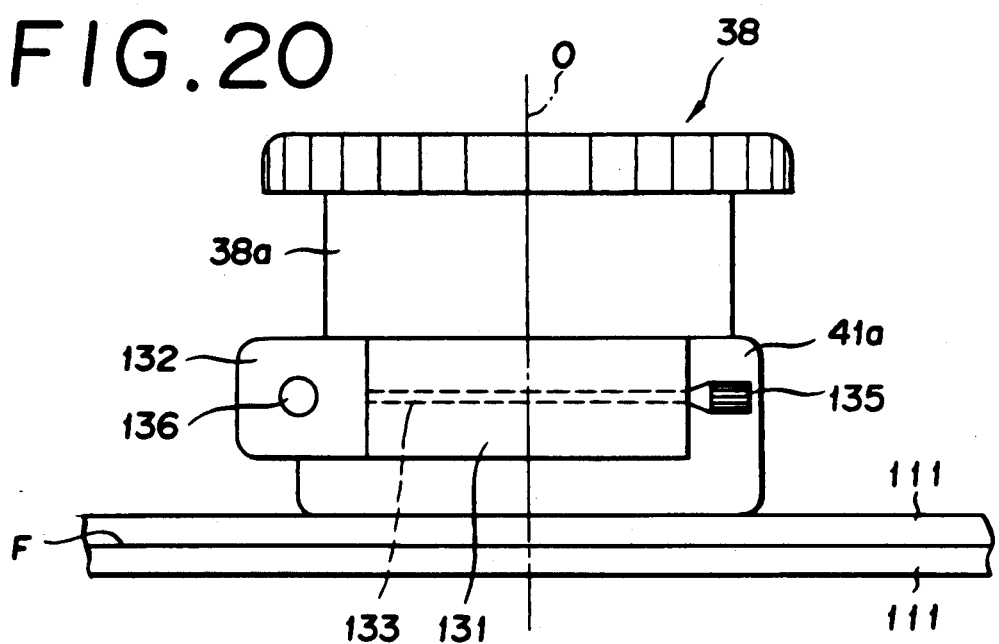
FIG. 20 is a front view of FIG. 19.
Figure 21:
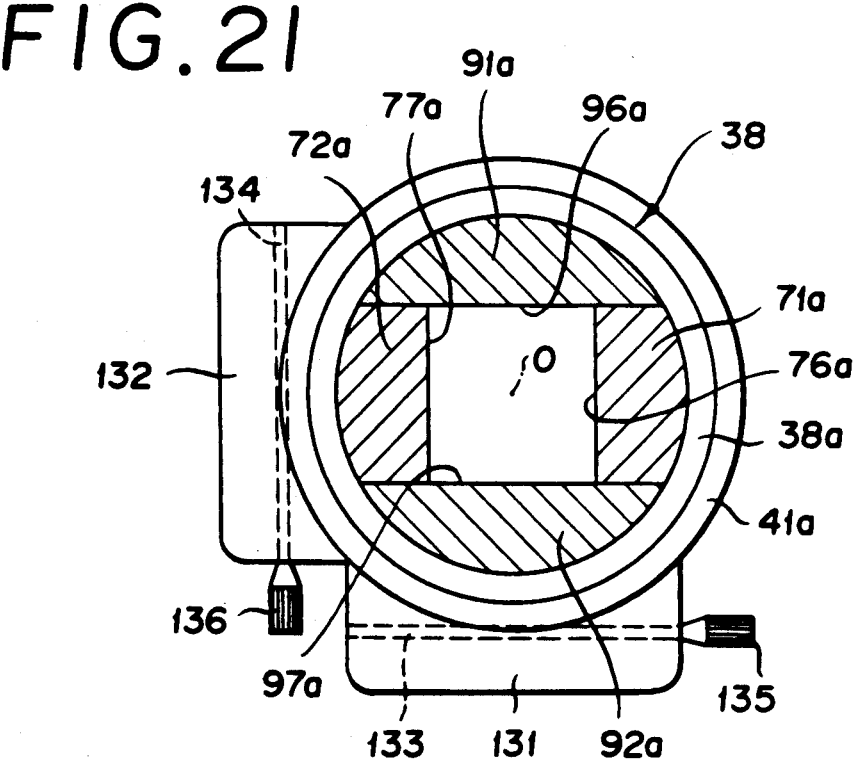
FIG. 21 is a plan view of FIG. 20.

From the outside of the annular member 41a, a first casing part 131 is projected outwardly in the radial direction and a second casing part 132 is similarly projected outwardly in the radial direction at a position veered from the position of the first casing part 131 at an angle of 90° around the optical axis 0. On the first casing part 131, an adjusting shaft 133 is mounted as illustrated in FIG. 20 and FIG. 21 so as to be rotated freely with a bearing (not shown). On the second casing part 132, an adjusting shaft 134 is mounted in such a manner as to be freely rotated with a bearing (not shown). These adjusting shafts 133, 134 are mutually disposed so that their extensions will perpendicularly intersect each other. The leading end of the adjusting shaft 133 protudes from the first casing part 131. A pinch 135 is formed on the leading end. Similarly, the leading end of the adjusting shaft 134 protrudes from the second casing part 134. A pinch 136 is formed on the leading end.

Figure 22:
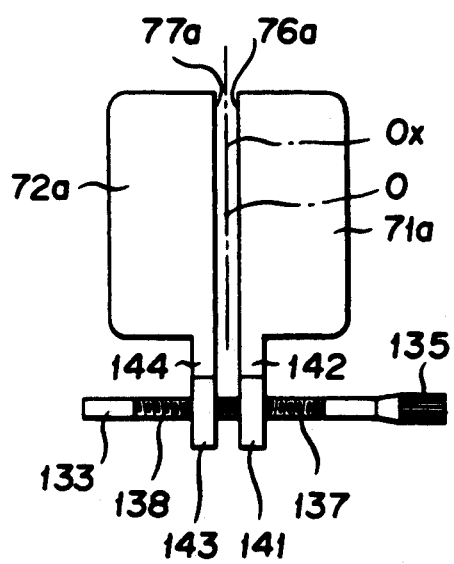
FIG. 22 is a plan view illustrating a first masking element incorporated in the masking unit appearing in FIG. 19.
Figure 23:
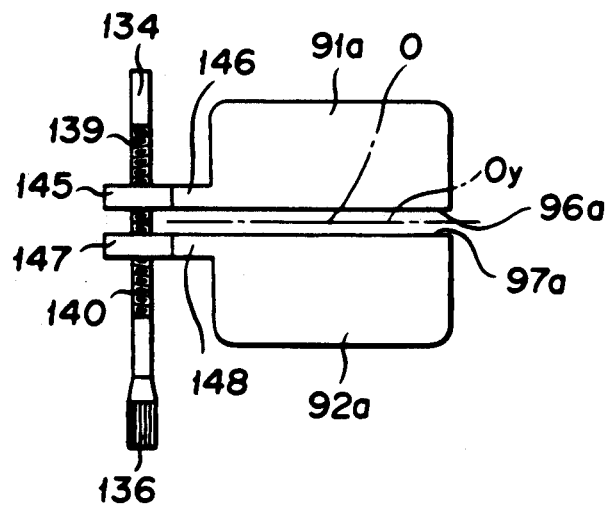
FIG. 23 is a plan view illustrating a second masking element.

On the adjusting shaft 133, two male screw parts 137, 138 threaded in mutually opposite directions are formed as separated from each other in the central part of the adjusting shaft 133 as the boundary, as illustrated in FIG. 22. Similarly on the adjusting shaft 134, two male screw parts 139, 140 threaded in mutually opposite directions are formed as separated from each other in the central part of the adjusting shaft 134 as the boundary, as illustrated in FIG. 23.

A masking member 71a provided with a masking edge 76a is fitted through the medium of a connecting part 142 to a bearing part 141 provided with a female screw to be meshed with the male screw part 137. A masking member 72a provided with a masking edge 77a fitted through the medium of a connecting part 144 to a bearing part 143 provided with a female screw to be meshed with the male screw part 138.

Further, a masking member 91a provided with a masking edge 96a is fitted through the medium of a connecting part 146 to a bearing part 145 provided with a female screw to be meshed with the male screw part 72a. A masking member 92a provided with a masking edge 97a is fitted through the medium of a connecting part 148 to a bearing part 147 provided with a female screw to be meshed, with the male screw part 140.

The image projecting system which is provided with the masking unit 41a integrated with the projection lens 38 as described above can perform an operation similar to the masking operation described above with reference to FIG. 11 to FIG. 13.

In this case, even if the microfiche film is located slant relative to the carrier part 111, the masking area can be varied correspondingly to the tilted image by rotating the base 41a.

The masking unit case 41a is integrated with the lens barrel 131 of the projection lens. Through the medium of this lens barrel 131, the masking unit case 41a is fitted to the carrier part 111 illustrated in FIG. 18. Again in this case, the masking unit 41a may be formed independently of the carrier part 111 so as to perform the operation described above with reference to FIG. 16a to FIG. 16c. Even in this case, the masking unit case 41a is fitted to the projection lens 38 as disposed thereunder.

What is claimed is:

1. In an image projecting device which causes a light from a light source to impinge on a film and projects an image on said film onto an image receiver through a projection lens, the improvement comprising:
   masking means for intercepting an optical path from said light source to said image receiver, the masking means being formed integrally with said projection lens, and
   means for rotating the masking means, said masking means being rotatable around the optical axis relative to the film.

2. An image projecting device according to claim 1 wherein said masking means comprises a first masking element for intercepting said optical path from opposite sides in a first direction and a second masking element for intercepting said optical path from opposite sides in a second direction perpendicularly intersecting said first direction.

3. An image projecting device according to claim 2, wherein said masking means is provided with means for adjusting the range of said optical path to be masked by said first and second masking elements.

4. An image projecting device according to claim 1, wherein said masking means is detachably fitted to the device body.

5. An image projecting device according to claim 4, wherein said masking means is fitted between said light source and said projection lens.

6. An image projecting device according to claim 1, wherein said masking means is positioned on the film side of said projection lens.

7. An image projecting device according to claim 6, wherein said masking means comprises a base formed rotatably on said projection lens and a masking element disposed on said base and adapted to effect variable interception of said optical path.

8. An image projecting device according to claim 1, wherein said masking means includes two sets of a pair of masking members and a pair of support rods, each support rod mounting a pair of masking members, and means for moving each pair of masking members along their support rods to cause predetermined edges of the masking members to move relative to each other, whereby adjustment of an aperture opening between the masking members can be accomplished.

9. An image projecting device according to claim 8, wherein each masking member is of a different perimeter configuration to accommodate the mounting on the support rods.

10. An image projecting device according to claim 8, wherein each support rod defines longitudinal parallel axes and the masking members extend at an angle to those longitudinal axes.

11. An image projecting device for projecting an image of a film on an image receiver, comprising:
    a light source;
    a projecting lens, and
    masking means rotatably provided between the light source and the projecting lens for intercepting the optical path, the masking means being provided integrally with said projection lens and being rotatable without rotating the film.

12. An image projecting device according to claim 11, wherein said masking means includes a pair of masking elements for intercepting the optical path from opposite sides in a predetermined direction.

13. An image projecting device according to claim 12, wherein said pair of masking elements is movable to alter the range of the optical path to be intercepted.

14. An image projecting device according to claim 13, wherein said pair of masking elements moves symmetrically with respect to a predetermined datum line.

15. An image projecting device according to claim 12, wherein said masking means further includes a pair of masking elements for intercepting the optical path from the opposite sides in a direction perpendicular to said predetermined direction.

16. An image projecting device according to claim 11, wherein said masking means is detachably fitted to the device body.

17. An image projecting device according to claim 11, wherein said masking means rotates around the optical axis as the center point of rotation.

18. An image projecting device which causes a light from a light source to impinge on a film and projects an image on said film onto an image receiver through a projection lens, the improvement comprising:
    masking means for intercepting an optical path from said light source to said image receiver, including two sets of a pair of masking members and a pair of support rods, each support rod mounting a pair of masking members;
    means for moving each pair of masking members along their support rods to cause predetermined edges of the masking members to move relative to each other, whereby adjustment of an aperture opening between the masking members can be accomplished, and
    means for rotating the masking means, said masking means being rotatable around the optical axis relative to the film.

19. In an improved image projecting device which causes light from a light source to impinge on a film and projects an image on said film onto an image receiver through a projection lens, the improvement comprising:
    two sets of a pair of masking members, each set having variably spaced masking edges interposed between the light source and the image receiver, the variably spaced masking edges defining a variable sized aperture for a desired portion of the projected image to project therethrough;
    a frame member for supporting the masking members at a predetermined radial displacement from an optical axis; and
    means for moving the frame member and the masking members radially about the optical axis whereby the variable sized aperture may be variable rotated about the optical axis.

20. The image projecting device according to claim 19 further comprising support means for supporting the frame member and wherein the means for moving is comprised of a pair of arcuate slots concentric to the optical axis defined in one of the support means and the frame member and a corresponding pair of pins that fit within and movably engage the pair of arcuate slots defined in the other of the support means and the frame member.

21. In an improved image projecting device which causes light from a light source to impinge on a film and projects an image on said film through a projection lens and onto an image receiver, the improvement comprising:
two sets of a pair of masking members having variably spaced opposed masking edges, the variably spaced masking edges defining a variable sized aperture that allow only a desired portion of the projected image to project therethrough;
a pair of support rods, each support rod mounting a pair of masking members;
means for moving each pair of masking members along their support rods to cause the masking edges of the masking members to move relative to each other, whereby adjustment of the variable sized aperture can be accomplished;
a frame member for supporting the masking members and the support rods at a predetermined radial displacement from an optical axis;
support means for supporting the frame member;
a pair of arcuate slots concentric to the optical axis being defined in one of the support means and the frame member and a corresponding pair of pins that fit within and movably engage the pair of arcuate slots being defined in the other of the support means and the frame member, whereby the variable sized aperture may be rotated about the optical axis by rotating the frame member about the optical axis.

22. In an image projecting device which causes a light from a light source to impinge on a film and projects an image on said film onto an image receiver through a projection lens, the improvement comprising:
masking means for intercepting an optical path from said light source to said image receiver, including a pair of masking members and a support rod which supports the pair of masking members;
means for moving the pair of masking members along the support rod to cause predetermined edges of the masking member to move relative to each other; and
means for rotating the masking means, said masking means being rotatable around the optical axis relative to the film.

23. In an improved image projecting device which causes light from a light source to impinge on a film and projects an image on said film onto an image receiver through a projection lens, the improvement comprising:
a pair of masking members having variably spaced masking edges interposed between the light source and the image receiver, the variably spaced masking edges defining a variably sized aperture for a desired portion of the projected image to project therethrough;
a frame member for supporting the masking members at a predetermined radial displacement from an optical axis; and
means for moving the frame member and the masking members radially about the optical axis, whereby the variably sized aperture may be variably rotated about the optical axis.

24. The improved image projecting device of claim 23 further comprising support means for supporting the frame member and wherein the means for moving is comprised of an arcuate slot concentric to the optical axis defined in one of the support means and the frame member and a pin that movably engages the arcuate slot defined in the other of the support means and the frame member.

25. In an improved image projecting device which causes light from a light source to impinge on a film and projects an image on said film through a projection lens and onto an image receiver, the improvement comprising:
a pair of masking members having variably spaced opposed masking edges, the variably spaced masking edges defining a variably sized aperture that allows only a desired portion of the projected image to project therethrough;
a support rod mounting the masking members;
means for moving the masking members along the support rod to cause the masking edges of the masking members to move relative to each other;
a frame member for supporting the masking members and the support rod;
support means for supporting the frame member; and
an arcuate slot concentric to the optical axis being defined in one of the support means and the frame member and a pin that movably engages the arcuate slot being defined in the other of the support means and the frame member, whereby the variably sized aperture may be rotated about the optical axis by rotating the frame member about the optical axis.

* * * * *